INVENTOR.
CLARENCE R. ADAMS

April 26, 1960  C. R. ADAMS  2,934,084
BUTTERFLY CHECK VALVES
Filed April 12, 1954  2 Sheets-Sheet 2

INVENTOR.
CLARENCE R. ADAMS
BY
Reynolds, Beach & Christensen
ATTORNEYS

United States Patent Office 2,934,084
Patented Apr. 26, 1960

2,934,084

BUTTERFLY CHECK VALVES

Clarence R. Adams, Kirkland, Wash., assignor to Boeing Airplane Company, Seattle, Wash., a corporation of Delaware Application April 12, 1954, Serial No. 422,330

17 Claims. (Cl. 137—527.4)

While the check valve of the present invention is of the butterfly type, it is capable of sealing by engagement with a seat comparable to a flap type check valve and is also capable of opening fully to reduce to a minimum impediment to normal flow of fluid through a conduit in which the valve is located.

An important object of the present invention is to provide a reasonably large check valve which can respond immediately to any tendency for the flow of fluid in a conduit to reverse, and which is sufficiently rugged to afford satisfactory service in situations where the direction of fluid flow through the conduit reverses frequently and abruptly. This capability of the check valve fits it for use in pneumatic systems of aircraft to which air is supplied by jet engines, the speed of which may be changed quickly and through a wide range.

Despite fluctuations in fluid pressure and flow velocity in a conduit in which the valve is received, it is an object to provide a valve which will be held fully open by the air flow through the conduit without flutter.

A further object is to use the butterfly valve principle for a check valve in a conduit installation subject to abrupt reversals in flow so as to reduce the violence of the valve impact on its seat upon flow reversal while enabling the valve to move quickly into checking position and in such position to seal the conduit against flow past the valve.

In providing such a valve it is an object to utilize mechanism which will enable the flow of fluid through the conduit in which the valve is located to induce full and prompt opening movement of the valve from its closed position without creating appreciable resistance to flow of fluid through the conduit in which the valve is received or turbulence of such fluid.

An advantage of the present valve is that for a conduit of given diameter the valve can be made smaller and lighter, which is an advantage for aircraft use. Nevertheless, the valve structure is rugged and able to withstand the stresses to which it is subjected in opening and closing rapidly, as discussed above.

A valve structure capable of accomplishing the objects mentioned may include a valve disk pivoted slightly above its center and engageable with one side of an annular shoulder in the conduit in which the valve is received. The valve shaft is mounted to one side of such shoulder offset from a diameter of the duct parallel to the pivot axis, and the pivot mounting enables movement of the shaft toward the valve seat shoulder and toward the arc of such shoulder engageable by the minor segment of the valve. At the same side of the valve seat shoulder as the valve's pivot mounting and in the minor segment of the two segments into which the conduit is divided by the valve shaft is located a segment-shaped constricted aperture in which the pressure of the fluid is reduced so as to create a pressure differential at opposite sides of the valve, which will swing it into fully open position. The mounting for the valve's shaft mentioned above enables the valve to be displaced somewhat transversely of the conduit to slide into contact with its seat on the annular shoulder.

Figures 1, 2:
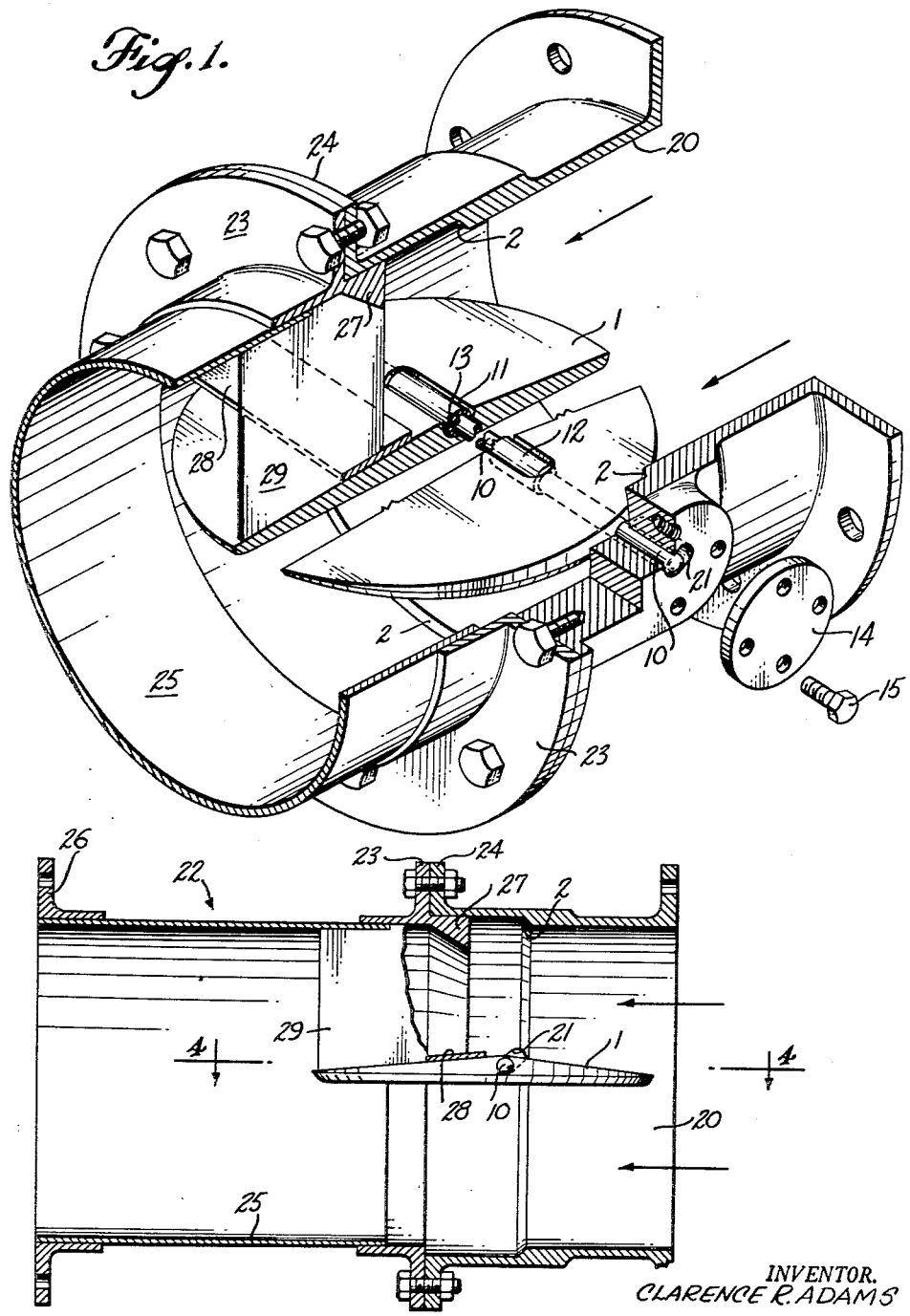
Figure 1 is a top perspective view of a check valve installation employing the present invention, with parts broken away and other parts shown in exploded position.
Figure 2 is a vertical longitudinal sectional view through the valve installation shown in Figure 1, with the valve illustrated in open position.

Particularly in airplanes of the gas turbine propelled type, compressed air is used extensively for starting turbines and for driving auxiliary devices such as turbogenerators for generating alternating current electricity, wing flap actuating mechanism, landing gear retracting mechanism, and wheel brake actuating mechanism. Customarily air is bled from the compressor unit of one gas turbine to be used in starting another gas turbine, and air is supplied from one or more gas turbine compressors for operation of such auxiliary devices under varying operating conditions of the turbine or turbines. Consequently, precautions must be taken to prevent air being wasted through an air supply connection to a gas turbine which is not operating or which is operating at a speed so slow that its compressor cannot supply bleed air to the air supply system for the auxiliary devices at a pressure high enough to be of value. For that reason it is necessary to provide check valves in different portions of such an airplane compressed air system which are opened automatically by flow of air in one direction through the conduit in which they are located and closed automatically by a tendency for flow to occur in the opposite direction.

In the disclosure of the patent application of Schaal and Lawler, Serial No. 195,284, now Patent No. 2,692,476, for a Gas Turbine Engine Air Starting Motor Constituting Air Supply Mechanism, for example, check valves are illustrated in air conduits of an airplane compressed air system. The check valve of the present invention could be used effectively in an installation such as disclosed in the Schaal and Lawler patent application mentioned above, or in other applications to an aircraft compressed air system, as well as in pressure fluid systems presenting generally comparable problems of enabling fluid to flow as freely as possible in one direction through a conduit and preventing flow of fluid through such conduit in the opposite direction.

During maneuvering of an airplane its engines may be accelerated or decelerated quite abruptly. On excessive deceleration of an engine it is desirable to close automatically a duct into which air is normally bled from the compressor of such engine. When the engine again is accelerated sufficiently, such duct should be reopened automatically. A check valve for controlling the flow of air through a duct in this manner should be able to respond promptly to such reversals in fluid flow, and in addition should be capable of blocking completely flow of fluid toward the engine when it is decelerated below a predetermined speed, and the valve should be capable of opening fully to impede flow from the engine as little as possible when the engine speed has again been increased to a value slightly higher than the selected critical speed. Such a check valve installation, therefore, should be sufficiently sensitive to move between fully closed and fully open position upon occurrence of a relatively small pressure change in the conduit in which the valve is located.

In order to enable the check valve of the present invention to be able to seal the conduit as tightly as possible against reverse flow when the check valve is closed, the valve 1 shown in Figure 1 has been mounted to seat against an annular shoulder 2 formed in the duct section 20 and facing downstream in the direction in which fluid normally flows through the conduit, as indicated by the arrows. The sensitivity of the valve 1 is increased by pivoting it on a shaft 10 located generally diametrically of the valve to that the valve may be designated as of the butterfly type. The pivot shaft, however, is offset slightly from a true diameter of the valve so that air flowing through the conduit in the normal direction as indicated by the arrows will impose a differential pressure on the valve segments at opposite sides of the valve's pivot axis, which will tend to swing the valve toward open position. The axles should be offset from a diameter of the valve sufficiently so that the normal air flow will exert an appreciable resultant force on the valve tending to swing it toward open position without being offset so much that flow of fluid through the conduit either in the normal direction or in the reverse direction will swing the valve too violently either toward closed position or toward open position.

When there is no flow of air through the conduit in either direction, it is desired that the valve assume a position between fully closed and fully opened position. It is preferred, therefore, that the valve be mounted with shaft 10 disposed in a substantially horizontal position with the larger segment of the valve downward, although the valve will be operative in whatever position the valve shaft may be placed. The valve shaft has its opposite ends received in slots 21 formed in the duct section 20, which slots are inclined toward the portion of the valve seat shoulder 2 engageable by the minor segment of the valve.

Figure 3:
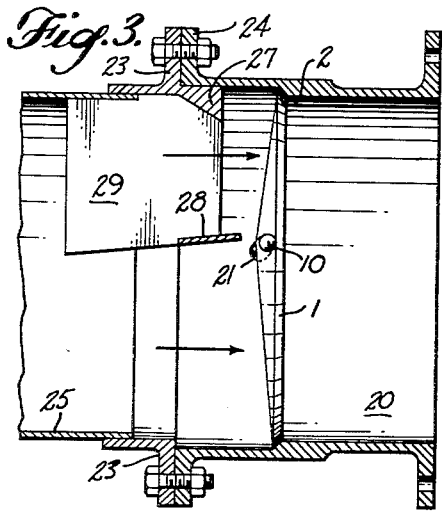
Figure 3 is a similar view with the valve shown closed.

If the duct section 20 is mounted so that the portion of valve seat shoulder 2 engageable by the minor segment of the valve 1 is uppermost, as shown in Figures 1, 2 and 3, the valve will be disposed in upright position with the ends of the shaft 10 resting in the lower ends of the slots 21 when there is no flow of fluid through the duct. As shown, the shaft 10 may be mounted slightly offset transversely of the valve from the center of gravity, so that in absence of flow through the conduit the valve may be tilted slightly toward open position. In the event that the fluid in the conduit should exert pressure on the side of the valve remote from the valve seat shoulder tending to effect a flow of fluid through the conduit in a direction opposite to the normal direction of flow indicated by the arrows in Figures 1 and 2, the valve immediately will be moved into the closed or check position shown in Figure 3 by the valve being swung about its pivot axis into a plane parallel to the plane of the annular shoulder 2 and being slid edgewise transversely of the conduit by the wedging action of slots 21 on axle 10 until the periphery of the valve seats snugly on the shoulder 2 in the position of Figure 3.

Figure 4:
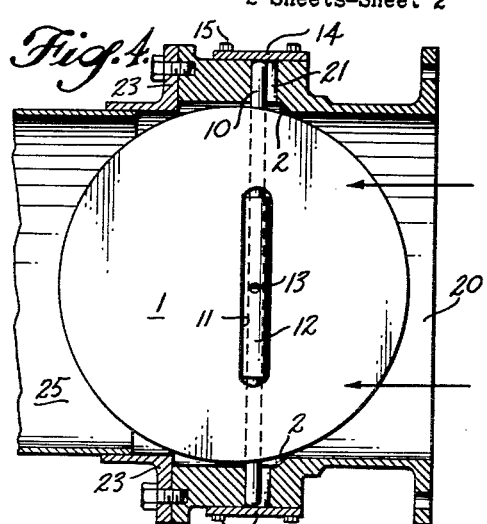
Figure 4 is a horizontal longitudinal sectional view through the valve installation taken on line 4—4 of Figure 2.

If, on the other hand, flow through the conduit 20 occurs in the normal direction indicated by the arrows in Figures 1, 2 and 4, a greater pressure would be exerted on the major segment of the valve than on the minor segment, producing a force operable to swing the valve in the clockwise direction about its pivot as seen in Figure 2. So that the flow through the conduit will be impeded as little as possible, it is desirable even for low pressures and flows for the check valve to swing fully into a plane parallel to the direction of fluid flow through the conduit, as illustrated in Figure 2. The closer the valve's pivot axis is located to the center of the valve, the less force will normally be required to swing the valve into such alignment. On the contrary, however, the closer the pivot is to a diametrical position, the greater would be the delay in closing of the valve upon reversal of air flow in the conduit. A very rapidly acting valve is highly desirable.

To insure that even for low flows in the normal direction the valve 1 will be swung fully into a plane parallel to the axis of the conduit 20, provision is made for creating a pressure differential in the portions of the conduit 20 at opposite sides of the valve, as well as a differential pressure on the opposite segments of the valve itself. As the valve swings more nearly into an axial plane of the conduit, the difference in area of the segments projected on a plane perpendicular to the axis of the conduit is reduced, and consequently, the differential pressure for a given air flow decreases. It is virtually impossible, therefore, to swing the valve into full open position solely by the action of uniform fluid flow pressure across the conduit acting on the valve.

It has been found, however, that a butterfly check valve having a supporting axle somewhat offset from its diameter comparable to the valve 1 and axle 10 illustrated in the drawings can be swung upward into an axial plane of the conduit by inserting into the conduit structure which will establish a differential in the pressure of the air flowing through the portions of the conduit at opposite sides of the valve or valve rotative axis. Such structure is a segmental constricted aperture located in the portion of the conduit at the side of the valve axle 10 in which the minor segment of the valve moves, but located axially of the conduit at the side of such axle opposite the minor valve segment. Such structure is located reasonably close to the axle, so that when the valve swings toward open position it will be in registry with the major segment of the valve in a direction transversely of the conduit in which the valve is mounted.

In the conduit structure illustrated in Figures 1 to 4, inclusive, the valve 1, as has been discussed, is mounted in the conduit section 20. Aligned with this conduit section is a further conduit section 22 located downstream of the conduit section 20 in the direction of normal fluid flow through these sections. This conduit section may have a flange 23 which can be bolted to a complemental flange 24 formed on the adjacent end of conduit section 20 to connect these conduit sections in registry, as shown in Figures 1, 2 and 3. The conduit 22 may carry the constriction, and this may be formed integral with the flange 23. Because of its contour, such constriction preferably is a forged or cast part and may be cast integral with the flange. The conduit section 22 may be made of any desired length by securing to the constriction a tubular section 25 of constant cross section. The end of this tubular portion remote from flange 23 may carry another connecting flange 26.

The constriction 27 is illustrated in Figures 1, 2 and 3 as an arcuate rib of substantially triangular cross section, having one apex integral with the flange 23 and projecting from such flange in a direction opposite conduit portion 22 for extension within the pipe section 20. The exterior contour of this rib would be cylindrically arcuate, the inner contour would be conical so that the constriction tapers and the passage through it flares toward the flange 23 or in the direction of fluid flow, and the third side of the constriction is disposed in a plane substantially perpendicular to the direction of the normal air flow through the conduit portrayed by the arrows in Figures 1 and 2. A stop bar 28 extending chordwise of the conduit 20 parallel to the valve axle 10 subtends the tapered constriction 27 to form a circular segmental passage flaring downstream in the normal direction of fluid flow. The stop bar is arranged to serve as a stop engageable by the valve 1 in fully open position in a plane disposed axially of the conduit to prevent over-travel of the valve beyond such fully open position.

When the valve 1 is subjected to air flow through the conduit in the normal direction indicated by the arrows in Figures 1 and 2, the differential pressure between that exerted on the major segment of the valve and that exerted on the minor segment of the valve, as defined at opposite sides of the axle 10, created by the air flow will swing the valve toward open position. Such air flow passing through the segmental constricted aperture defined by the rib 27 and bar 28 will be accelerated to create a relatively low pressure area above the major segment of the valve, so that the differential pressure acting on opposite sides of this valve segment will swing it upward until the valve engages the crossbar 28.

As has been mentioned above, the axle 10 is offset sufficiently from a diameter of the valve so that enough differenial pressure will be produced upon it to swing the valve quickly during its initial travel toward open position. The restriction of the segmental constricted aperture should be sufficient to complete the travel of the valve quickly. The momentum of valve movement thus produced may cause it to strike the crossbar 28 severely, yet it is desired that this crossbar be kept thin so that it will not excessively impede the flow of air through the conduit. To enable the bar 28 to withstand the impact a strut 29 may bridge between the central portion of such bar and the conduit section 25 substantially in an axial plane and a radial plane of the conduit approximately perpendicular to the bar 28, as shown in Figures 1, 2 and 3.

The axle 10 of valve 1 preferably turns in its slots 21 in which the axle ends are received. This shaft extends through a bore in the thickened central portion of the valve offset the desired distance from a diameter of the valve. A slot 11 in one face of the valve may afford access to such axle-receiving bore. An axle sleeve 12 may be placed in such slot and associated enlarged portion of the valve bore, so that when the axle is slid through the valve bore it may also pass through the hollow of such sleeve. If the sleeve 12 is of a length substantially equal to the full length of the slot 11 and the sleeve is secured to the axle 10 by a set screw 13, such sleeve will prevent the axle from moving lengthwise appreciably relative to the valve.

In assembling the valve mechanism the conduit portions 20 and 25 may have their flanges 23 and 24 bolted together. Valve 1 will then be placed within the conduit section 20 in a position such that its axle-receiving apertures are generally in alignment with the journal slots 21. The axle may then be pushed through one of these slots into the valve, the sleeve 12 lodged in the slot 11, and the axle threaded through such sleeve, the bore in the other side of the valve, and the other journal slot 21. When the shaft, valve and sleeve 12 have been properly centered, the set screw 13 will be tightened to hold the valve and its shaft together as a unit. A cover plate 14 may then be secured by bolts 15 over the outer end of each slot 21. To hold the valve properly centered with the least possible friction to facilitate valve movement, the ends of the shaft 10 may be rounded as shown in Figure 1, so that they have substantially point bearing engagement with the cover plates 14.

A butterfly check valve of this type is found to move fully open or fully closed promptly without violent impact and without fluttering or chatter. These characteristics of the valve are particularly important when the flow through the conduit surges rapidly. Such a valve may be made smaller and lighter than a flap type valve for comparable effectiveness, and the pressure drop caused by obstruction of the air flow through the conduit resulting from the presence of the valve mechanism is only slightly higher than that produced by other valves of comparable capacity. Tests have shown that a valve of this type can be moved from fully open position to fully closed position when the direction of air flow is reduced in a period of .04 second.

Figure 5:
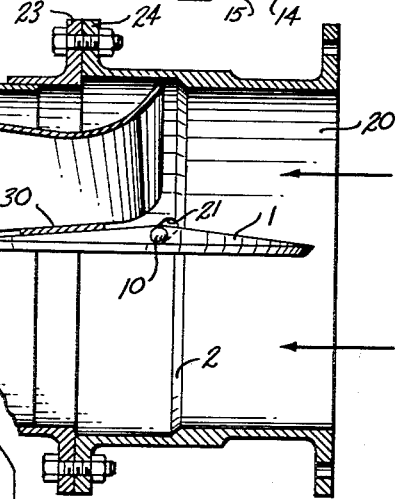
Figure 5 is a vertical longitudinal sectional view through an alternative form of valve installation with parts broken away.

If minimum resistance to flow of fluid through the check valve conduit is desired, the segmental constricted aperture may be of segmental Venturi tube shape, as shown in Figure 5. In this instance the valve structure and the conduit in which it is mounted are the same as those previously described. So also is the pipe section 25 with its flanges 23 and 26 at its opposite ends. In this instance, however, instead of the constriction 3 being integral with the conduit section, such constriction is formed separately to fit into the conduit. Thus, as shown, the streamlined insert shape may be constructed of sheet metal and welded about its edges to the inner wall of the conduit section 25. The crossbar 30 may also have its ends welded in place to the opposite walls of the conduit after the constriction 30 has been secured in place.

It will be noted that the constriction 3 forms an arcuate rib having a much smoother entrance for air flowing in the normal direction indicated by the arrows in Figure 5, and the downstream portion of the constriction rib flares gradually to reduce as far as possible the turbulence of the air passing through the throat of the segmental Venturi tube. By utilization of this type of construction the resistance to flow of air through the conduit is reduced so that the check valve installation in its entirety does not produce a greater resistance to flow than any other type of check valve installation despite the constricted passage. While the type of check valve installation shown in Figure 5 has lower resistance than the installation shown in Figures 1 to 4, inclusive, it would not be as practical for many installations because of the greater length required for the gradually flared discharge portion of the segmental Venturi tube, and this type of construction would probably be more expensive than the previously described type of installation to manufacture.

The check valve unit shown in Figure 6 utilizes the same principles of construction as described in connection with the check valve installation shown in Figures 1 to 4, inclusive, but is much more compact. In this instance the check valve structure and axle mounting is substantially the same as that already described, and the opposite ends of axle 10 are received in inclined slots 21 as before, but in this instance such slots are formed in the thickened side portions 4 of a short valve supporting tubular section 41. Connecting flanges 42 and 43 are carried by opposite ends of this conduit section which may be bolted to adjoining conduit sections.

The shoulder 44 on which the valve seats is formed substantially in registry with one flange 43, and the segmental constricted aperture is formed by the arcuate rib 45 located adjacent to the other end of the conduit section 41. Such arcuate constriction rib and the chordal stop bar 46 may be formed as an integral structure which may be welded, brazed or otherwise suitably secured to the inner wall of the conduit section.

Figure 6:
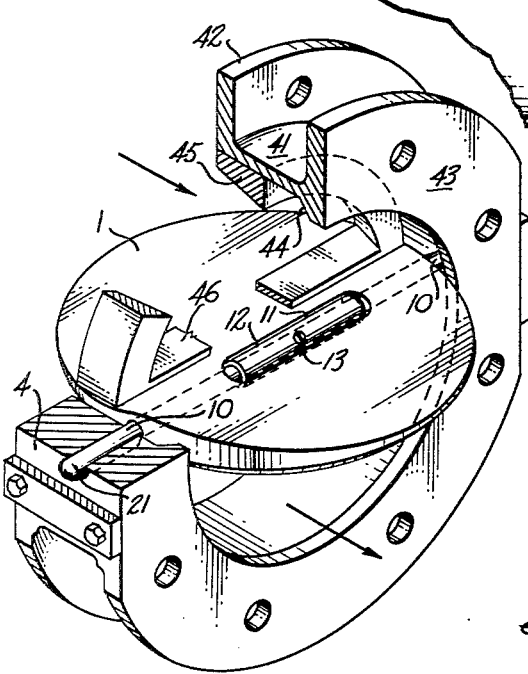
Figure 6 is a top perspective view of another form of the check valve mechanism, parts having been broken away.

While the stop bars 30 of Figure 5 and 46 of Figure 6 are shown as not having any central bracing strut like the radial strut 29 shown in Figures 1, 2 and 3, it is evident that such struts can be added in both instances or in either instance, if desired, to provide sufficient stiffness to the crossbar. Ordinarily for valves of smaller size, such as of two and one-half inches diameter, such a stiffening strut for the crossbar will not be necessary; whereas for valves of larger size, such as of four-inch diameter, it is desirable to provide such a strut.

I claim as my invention:

1. Check valve mechanism comprising a cylindrical conduit having therein an annular shoulder defining a valve seat, a circular butterfly check valve seatable on said valve seat, a shaft carrying said valve and offset from a diameter thereof to define major and minor valve segments at opposite sides of said shaft, said conduit having slots adjacent to said shoulder inclined toward the portion of said valve seat shoulder engageable by the minor segment of said valve and receiving the opposite ends of said shaft to guide said valve for edgewise sliding transversely of said conduit toward the portion of said shoulder engageable by the minor segment of said valve as said valve moves toward seated position on said shoulder and for edgewise sliding movement of said valve transversely of said conduit away from the portion of said shoulder engageable by the minor segment of said valve as said valve is retracted from engagement with said shoulder.

2. Check valve mechanism comprising a cylindrical conduit having therein an annular internal shoulder defining a valve seat, a circular butterfly check valve seatable on said shoulder, and a shaft carrying said valve and offset from a diameter thereof to define major and minor valve segments at opposite sides of said shaft, said conduit having slots in its opposite sides adjacent to said shoulder and receiving the opposite ends of said shaft, respectively, the segment of said conduit at one side of said shaft having a constriction therein defining an aperture extending lengthwise of said conduit and in registry transversely of said conduit with the major segment of said valve when it is fully open.

3. Check valve mechanism comprising a cylindrical conduit having therein an annular internal shoulder defining a valve seat, a circular butterfly check valve seatable on said shoulder, a shaft carrying said valve and offset from a diameter thereof to define major and minor valve segments at opposite sides of said shaft, said conduit having slots in its opposite sides adjacent to said shoulder and inclined toward the portion of said shoulder engageable by the minor segment of said valve and receiving the opposite ends of said shaft, respectively, a crossbar extending across said conduit substantially parallel to said shaft and located at the side thereof remote from said shoulder in position for engagement by said major valve segment when said valve is fully open substantially in a plane extending lengthwise of said conduit and parallel to its axis, and an arcuate constriction subtended by said crossbar and defining therewith a segmental constricted aperture in registry transversely of said conduit with the major segment of said valve when it is fully open.

4. Check valve mechanism comprising a cylindrical conduit having an annular internal shoulder defining a valve seat, a circular butterfly check valve seatable on said shoulder, a shaft carrying said valve and offset from a diameter thereof to define major and minor valve segments at opposite sides of said shaft, said conduit having slots in opposite sides thereof adjacent to said shoulder, inclined toward the portion of said shoulder engageable by the minor segment of said valve and receiving the opposite ends of said shaft, respectively, a crossbar extending across said conduit substantially parallel to said shaft and located lengthwise of said conduit at the side thereof remote from said shoulder in position for engagement by said major valve segment when said valve is fully opened substantially in a plane extending lengthwise of said conduit and parallel to its axis, and an arcuate constriction subtended by said crossbar and received in said conduit at the side of said shaft transversely of the conduit which is opposite the major valve segment and lengthwise of said conduit at the side of said shaft opposite said shoulder.

5. Check valve mechanism comprising a cylindrical conduit having an annular internal shoulder defining a valve seat, a circular butterfly check valve seatable on said shoulder and having a chordal aperture therethrough offset from a diameter thereof to define major and minor valve segments at opposite sides of said aperture, and having a groove communicating with said aperture and opening at the face of said valve opposite the side seatable on said shoulder, a sleeve received in said groove and of a length substantially equal to the length of said groove, a shaft having rounded opposite ends extending through said valve aperture and said sleeve, a set screw securing together said sleeve and said shaft for limiting lengthwise movement of said shaft relative to said valve by engagement of said sleeve with opposite ends of said groove, respectively, said conduit having slots in opposite sides thereof adjacent to said shoulder, inclined toward the portion of said shoulder engageable by the minor segment of said valve and receiving the opposite ends of said shaft, respectively, closure members closing the ends of said slots and engageable by the rounded ends of said shaft to resist thrust forces of said shaft, a crossbar extending across said conduit substantially parallel to said shaft and located lengthwise of said conduit at the side thereof remote from said shoulder in position for engagement by said major valve segment when said valve is fully opened substantially in a plane extending lengthwise of said conduit and parallel to its axis, an arcuate constriction subtended by said crossbar and received in said conduit at the side of said shaft transversely of the conduit which is opposite the major valve segment and lengthwise of said conduit at the side of said shaft opposite said shoulder, and a strut extending radially of said conduit bridging between said crossbar and said constriction.

6. Check valve mechanism comprising a conduit having therein a planar shoulder defining a valve seat, a butterfly check valve seatable on said valve seat shoulder, and a shaft carrying said valve, said conduit having slots adjacent to said shoulder inclined relative to the plane thereof, receiving the opposite ends of said shaft and guiding said valve for edgewise sliding in one direction transversely of said conduit toward seated position on said shoulder by movement of said shaft along said slots in one direction, and guiding said valve for edgewise sliding in the opposite direction transversely of said conduit away from said shoulder during opening of said valve by movement of said shaft along said slots in the opposite direction.

7. Valve mechanism comprising a conduit, pivot means within and extending transversely of said conduit, said conduit having a peripheral constriction within one half of the circumference of said conduit at one side of and downstream from said pivot means during flow of fluid through said conduit for accelerating flow of fluid past such constriction and correspondingly reducing the pressure at the location of such accelerated flow, the half of the circumference of said conduit at the opposite side of and downstream from said pivot means being relatively unconstricted, and a butterfly valve within said conduit of a size and shape at least substantially equal to the cross-sectional size and shape of said conduit and supported and guided by said pivot means for swinging from a position substantially closing said conduit, the movement of the valve section at such opposite side of said pivot means in a downstream direction toward said constriction being assisted by such reduction in pressure of fluid flowing past said constriction.

8. Valve mechanism comprising a conduit, pivot means within and extending transversely of said conduit, said conduit having a peripheral constriction within one half of the circumference of said conduit at one side of and downstream from said pivot means during flow of fluid through said conduit, a crossbar extending across said conduit substantially parallel to and downstream from the axis of said pivot means and subtending said peripheral constriction, defining therewith a segmental constricted aperture for accelerating flow of fluid therethrough and correspondingly reducing the pressure at the location of such accelerated flow, the circumference of said conduit at the side of said crossbar opposite from said peripheral constriction being relatively unconstricted, and a butterfly valve within said conduit of a size and shape at least substantially equal to the cross-sectional size and shape of said conduit and supported and guided by said pivot means for swinging from a position substantially closing said conduit, the movement of the valve section at the side of said pivot means opposite said peripheral constriction in a downstream direction toward and into engagement with said crossbar being assisted by such reduction in pressure of fluid flowing through said segmental constricted aperture.

9. Check valve mechanism comprising a cylindrical conduit having therein an annular internal shoulder defining a valve seat, a circular butterfly check valve seatable on said shoulder, a shaft extending chordwise of said conduit and carrying said valve offset from a diameter thereof to define major and minor valve segments at opposite sides of said shaft, a crossbar extending across said conduit substantially parallel to said shaft and located downstream from said shaft in position for engagement by said major valve segment when said valve is fully open substantially in a plane extending lengthwise of said conduit and parallel to its axis, and an arcuate constriction subtended by said crossbar and defining therewith a segmental constricted aperture.

10. Check valve mechanism comprising a conduit, a shaft extending within said conduit transversely thereof, said conduit having an arcuate rib projecting into said conduit at a first side of said shaft and immediately downstream from said shaft in the normal direction of flow, constricting the flow through the portion of said conduit at such first side of said shaft more than the flow through the portion of said conduit at the other side of said shaft and increasing the velocity and reducing the pressure of fluid flowing through the portion of said conduit at such first side of said shaft more than the velocity and the pressure of fluid flowing through the portion of said conduit at the other side of said shaft, and a butterfly check valve sufficiently large to engage and substantially close said conduit when disposed transversely thereof and freely swingably supported and guided by said shaft for opening swinging of the check valve so that swinging of the segment thereof downstream from said shaft is assisted by such reduced pressure of the fluid in the constricted portion of said conduit at such first side of said shaft.

11. The check valve mechanism defined in claim 10, in which the arcuate rib has an arcuate surface flaring gradually lengthwise of the conduit downstream away from the shaft and the corresponding lengthwise extent of the side of said conduit opposite said rib is of substantially constant curvature.

12. The check valve mechanism defined in claim 10, in which the arcuate rib has a substantially conical surface flaring gradually lengthwise of the conduit downstream away from the shaft and the corresponding lengthwise extent of the side of said conduit opposite said rib is of substantially cylindrical curvature.

13. The check valve mechanism defined in claim 10, in which the arcuate rib has a shoulder adjacent to the shaft including a surface defining the entering end of an arcuate constriction and located substantially in a plane disposed transversely of the conduit and the side of said conduit opposite said rib is substantially unconstricted.

14. The check valve mechanism defined in claim 10, in which the arcuate rib has a shoulder adjacent to the valve including a surface defining the entering end of an arcuate constriction and disposed in a radial plane of the conduit and the side of said conduit opposite said rib is substantially unconstricted.

15. The check valve mechanism defined in claim 10, in which the arcuate rib has a surface flaring abruptly lengthwise of the conduit upstream toward the shaft and the corresponding lengthwise extent of the side of said conduit opposite said rib is of substantially constant curvature.

16. Check valve mechanism comprising a generally cylindrical conduit, a shaft extending transversely in said conduit and offset from the center thereof to define major and minor segments of said conduit, the wall of the minor segment of said conduit having an arcuate rib projecting into said conduit immediately downstream from said shaft in the normal direction of flow to a greater extent than the corresponding wall of the major segment of said conduit, for increasing the velocity and reducing the pressure of fluid flowing through the minor segment of said conduit below the pressure in the corresponding lengthwise extent of the major segment of the conduit, and a circular butterfly check valve sufficiently large to engage and substantially close said conduit when disposed transversely thereof and freely swingably supported and guided by said shaft and having a larger portion in said major conduit segment swingable downstream from said shaft from a position closing the major segment of said conduit toward the minor segment of said conduit assisted by such reduced pressure in such minor segment of said conduit.

17. Check valve mechanism comprising a conduit having therein a planar shoulder defining a valve seat, a butterfly check valve seatable on said valve seat shoulder, and lost motion valve mounting means connected to said valve, supporting said valve from said conduit and including a slotted connection at each side of said valve between said valve and said conduit and adjacent to said shoulder, guiding said valve for edgewise sliding in one direction transversely of said conduit toward seated position on said shoulder during movement of said valve in one direction and guiding said valve for edgewise sliding in the opposite direction transversely of said conduit away from said shoulder during opening movement of said valve.

References Cited in the file of this patent

UNITED STATES PATENTS

| | | |
|---|---|---|
| 156,426 | Lanston | Nov. 3, 1874 |
| 345,420 | Eskholme | July 13, 1886 |
| 1,161,460 | Doble | Nov. 23, 1915 |
| 1,707,942 | Petit | Apr. 2, 1929 |
| 2,577,657 | Houks | Dec. 4, 1951 |
| 2,664,264 | Fennema | Dec. 29, 1953 |

FOREIGN PATENTS

| | | |
|---|---|---|
| 431,370 | France | of 1911 |
| 202,126 | Great Britain | of 1923 |
| 356,974 | Great Britain | of 1931 |
| 545,879 | Germany | of 1932 |
| 394,221 | Great Britain | of 1933 |